(12) United States Patent
Beylin et al.

(10) Patent No.: US 12,200,516 B2
(45) Date of Patent: Jan. 14, 2025

(54) E911 BACKHAUL ROUTING TESTS REMOTE FROM COVERAGE AREA

(71) Applicant: Spirent Communications, Inc., San Jose, CA (US)

(72) Inventors: Mikhail Beylin, Morgan Hill, CA (US); Ronald Royer, Grapevine, TX (US); Dat Phan, San Jose, CA (US); Ehab Bahjat, Rowlett, TX (US); In Seo, Fremont, CA (US)

(73) Assignee: Spirent Communications, Inc., Santa Clara, CA (US)

( * ) Notice: Subject to any disclaimer, the term of this patent is extended or adjusted under 35 U.S.C. 154(b) by 276 days.

(21) Appl. No.: 17/858,013

(22) Filed: Jul. 5, 2022

(65) Prior Publication Data
US 2024/0015535 A1    Jan. 11, 2024

(51) Int. Cl.
| | |
|---|---|
| H04W 24/06 | (2009.01) |
| H04M 3/22 | (2006.01) |
| H04M 3/42 | (2006.01) |
| H04M 3/51 | (2006.01) |
| H04W 40/20 | (2009.01) |
| H04W 64/00 | (2009.01) |

(52) U.S. Cl.
CPC ......... *H04W 24/06* (2013.01); *H04M 3/2281* (2013.01); *H04M 3/42221* (2013.01); *H04M 3/5116* (2013.01); *H04W 40/20* (2013.01); *H04W 64/00* (2013.01)

(58) Field of Classification Search
CPC ....... H04W 4/90; H04W 24/06; H04W 40/20; H04W 64/00; H04M 3/2281; H04M 3/42221; H04M 3/5116

USPC ...................................................... 455/404.2
See application file for complete search history.

(56) References Cited

U.S. PATENT DOCUMENTS

| | | | |
|---|---|---|---|
| 6,201,853 B1 | 3/2001 | Butler et al. | |
| 6,728,612 B1 * | 4/2004 | Carver ................... | H04L 43/50 701/34.3 |

(Continued)

OTHER PUBLICATIONS 3.5 mm Headset: Accessory Specification, Android Open Source Project, 5 pages, ("https://source.android.com/devices/accessories/headset/plug-headset-spec#functions" <accessed on Nov. 25, 2019>).
3.5 mm Headset Jack: Device Specification, Android Open Source Project, 4 pages, ("https://source.android.com/devices/accessories/headset/jack-headset-spec.html#software_mapping" <accessed on Nov. 25, 2019>).

(Continued)

*Primary Examiner* — Jean A Gelin
(74) *Attorney, Agent, or Firm* — Haynes Beffel & Wolfeld LLP; Ernest J. Beffel, Jr.; Jason Liao

(57) ABSTRACT

The disclosed technology teaches testing voice connection routing over 911 circuits as if voice calls originated from an E911 device in coverage areas of cell tower locations, without requiring a physical presence of the E911 device in each coverage area. A remote test agent audio bridge and tester originates a first call to a test user with a first phone number, creates a media bridge, emulates an E911-compliant mobile device to originate a second call to a 911 operator, relays audio over the media bridge as a verbal exchange between the first and the second calls, and logs an evaluation of the verbal exchange. The emulation includes spoofing a call origination from an origination location being tested, the spoofed origination location being within coverage of an originating cell.

20 Claims, 5 Drawing Sheets

(56) References Cited

U.S. PATENT DOCUMENTS

| | | | | |
|---|---|---|---|---|
| 8,868,028 | B1* | 10/2014 | Kaltsukis | H04W 76/50 |
| | | | | 455/404.1 |
| 9,167,079 | B1 | 10/2015 | Capecci et al. | |
| 9,398,466 | B1 | 7/2016 | Joung et al. | |
| 10,097,981 | B1* | 10/2018 | Talaganov | H04W 76/50 |
| 10,791,221 | B1* | 9/2020 | Vislocky | H04M 3/5116 |
| 10,805,462 | B1* | 10/2020 | Ginter | H04L 67/563 |
| 10,841,413 | B1 | 11/2020 | Pentakota et al. | |
| 2007/0019769 | A1* | 1/2007 | Green | H04B 17/391 |
| | | | | 375/360 |
| 2007/0153088 | A1 | 7/2007 | Hales et al. | |
| 2007/0177680 | A1* | 8/2007 | Green | H04W 24/00 |
| | | | | 375/260 |
| 2008/0159501 | A1* | 7/2008 | Cai | H04M 3/229 |
| | | | | 379/142.05 |
| 2009/0207978 | A1* | 8/2009 | Oldham | H04M 7/0075 |
| | | | | 379/45 |
| 2010/0135474 | A1 | 6/2010 | Smith | |
| 2014/0344874 | A1 | 11/2014 | Olsen | |
| 2017/0104527 | A1 | 4/2017 | Sinde | |
| 2017/0141845 | A1 | 5/2017 | Totten et al. | |
| 2018/0149687 | A1 | 5/2018 | Backus et al. | |
| 2019/0116506 | A1 | 4/2019 | Bendlin et al. | |
| 2019/0280438 | A1 | 9/2019 | German et al. | |
| 2019/0280504 | A1 | 9/2019 | Lee et al. | |
| 2019/0297503 | A1* | 9/2019 | Traynor | H04L 9/3271 |
| 2019/0335298 | A1* | 10/2019 | Mbonye | H04M 3/5116 |
| 2020/0035247 | A1* | 1/2020 | Boyadjiev | G06F 21/32 |
| 2021/0021979 | A1* | 1/2021 | Chiang | H04M 3/5116 |
| 2021/0233541 | A1* | 7/2021 | Chen | G10L 17/02 |

OTHER PUBLICATIONS

Spirent Landslide™ E10 Data Sheet, Spirent Communications, Inc., Oct. 2018, 4 pages.

"NENA i3 Standard for Next Generation 9-1-1, NENA-STA-010.3b-2021", National Emergency Number Association, Inc., Oct. 7, 2020, 673 pages.

Green, "FCC Workshop E911 Phase II Location Accuracy Overview", Sprint, 13 pages (dowloaded from (https://transition.fcc.gov/bureaus/pshs/911/Phase%202/Workshop_11_2013/Sprint_No2013_FINAL.pdf Sprint_No2013_FINAL)).

UserPlane Location Protocol v2.0.4, Section 5.1.15 Emergency Services Location Requests, Open Mobile Alliance, Dec. 13, 2018, pp. 107-112.

UserPlane Location Protocol v2.0.4, 6.1.5 Authentication Mechanisms applicable to an E-SLP, Open Mobile Alliance, Dec. 13, 2018, pp. 203-204.

FCC Fact Sheet, Implementing Kari's Law and Section 506 of RAY BAUM's Act, Report and Order—PS Docket Nos. 18-261 and 17-239, and GN Docket No. 11-117, Jul. 11, 2019, 163 pgs.

Ray et al, Alternative solutions for new E911 rules in 2020, FreePBX.com (Sangoma Technologies), 5 pgs, (downloaded Mar. 16, 2022 from https://community.freepbx.org/t/alternative-solutions-for-new-e911-rules-in-2020/64355).

Public Law 115-127, 115th Congress, Amendment 47 USC Section 609—Kari's Law Act of 2017, Feb. 16, 2018, 2 pgs.

U.S. Appl. No. 16/733,126, filed Jan. 2, 2020, U.S. Pat. No. 10,841,413, Nov. 17, 2020, Granted.

U.S. Appl. No. 18/127,590, filed Mar. 28, 2023, US 20240015245, Jan. 11, 2024, Pending.

U.S. Appl. No. 18/127,595, filed Mar. 28, 2023, US 20240015536, Jan. 11, 2024, Pending.

U.S. Appl. No. 18/127,593, filed Mar. 28, 2023, US 20240014909, Jan. 11, 2024, Pending.

* cited by examiner

E911 BACKHAUL ROUTING TESTS REMOTE FROM COVERAGE AREA

INCORPORATED REFERENCES

The following are incorporated by reference for all purposes as if fully set forth here:

U.S. application Ser. No. 16/733,126, Systems and Methods for Using an Audio Cross-connect Cable for Remote Mobile Device Testing, filed on 2 Jan. 2020, now U.S. Pat. No. 10,841,413 issued on 17 Nov. 2020.

Open Mobile Alliance (OMA), UserPlane Location Protocol (Approved Ver. 2.0.4), 13 Dec. 2018.

National Emergency Number Association (NENA), NENA i3 Standard for Next Generation 9-1-1, 7 Oct. 2121.

FIELD OF THE TECHNOLOGY DISCLOSED

The technology disclosed relates to remote Enhanced 911 (E911) testing. This testing is used to verify that new telephone network connections properly route E911 calls.

ACRYONYMS

Acronyms used in this disclosure are identified the first time that they are used. These acronyms are terms of art, often used in standards documents. Except where the terms are used in a clear and distinctly different sense than they are used in the art, we adopt the meanings found in testing standards. For the reader's convenience, many of them are listed here:

| | |
|---|---|
| APN | Access Point Name |
| E911 | Enhanced 911 |
| E-SLP | Emergency SLP |
| FCC | Federal Communications Commission |
| H-SLP | Home SLP |
| MLTS | Multi-Line Telephone Systems |
| PSAP | Public Safety Answering Point |
| QoP | Quality of Position |
| RTP | Real-Time Protocol |
| SAP | Service Access Point |
| SET | SUPL Enabled Terminal |
| SLP | SUPL Location Platform |
| SUPL | Secure User Plane Location |
| SIP | Session Initiation Protocol |
| UE | User Equipment |

BACKGROUND

When a telephone company replaces equipment facilitating transport in a telephone network, the company must ensure that 911 calls from user equipment (UE) in the vicinity of cell towers are properly routed to the correct Public Safety Answering Point (PSAP). For example, it is unacceptable for a 911 call made anywhere in Bucks County, Pennsylvania to be routed to Plano, Texas. To ensure public safety, the telephone company must test that the replacement transport still correctly routes 911 calls.

A naïve testing approach for 911 routing is for the telephone company to send a tester to each coverage area of a different cell tower, and with UE in hand, dial 911. The naïve approach is expensive, logistically intractable, and negatively impacts cell service. The naïve approach is expensive because the number of coverage areas to be tested may be large number, and thus the telephone company may have to employ a veritable legion of testers to perform the testing. The naïve approach is logistically infeasible because it is infeasible to coordinate legion of testers to different disparate locations and to reach within certain time and expect that the large number of testers will all arrive on schedule. Testers may become lost during travel, or otherwise mistaken as to their destination, leading to almost inevitable schedule slippage. Furthermore, the naïve approach negatively impacts service because coordinating the tests to be finished in a timely fashion without overwhelming PSAP operators may be difficult without adding in buffer time between the various tests, but prolonging testing for too long may interfere with cell service availability.

Besides the difficulties raised by testing approaches, 911-related technology has legislative requirements that are intended to guarantee call quality, connectivity and location accuracy, tests must also ensure regulatory compliance.

In 2019, the FCC enacted rules that implemented Kari's Law and RAY BAUM'S Act. Kari's Law, enacted by Congress in 2019, requires direct 911 dialing and notification capabilities in multi-line telephone systems (MLTS). As such, an MLTS cannot redirect a 911 call into a front desk operator or security kiosk, or place the call on hold.

FCC rules with respect to RAY BAUM'S Act requires that 911 calls are conveyed to the PSAP with a "dispatchable location"—a location consisting of the validated street address of the calling party, plus additional information such as suite, apartment, or similar information necessary to adequately identify the location of the calling party.

While such constraints may be beneficial for live 911 callers, they raise challenges to efficient testing of an E911 system.

An opportunity arises to provide remote testing by location emulation and conference calling while testing E911 conditions.

BRIEF DESCRIPTION OF DRAWINGS

FIG. 1A illustrates the relationships between entities of the E911 testing scenario. FIG. 1B illustrates remote E911 testing in the testing scenario.

DETAILED DESCRIPTION

A testing approach that is better than the naïve testing approach is to use statistics and network route mapping to intelligently reduce the number of tests performed. Another approach is to use a single tester to cover multiple cell towers. Despite these approaches, if a county has on the order of a thousand cell towers, and careful planning reduces the number of tests that must be performed to 10%, that still leaves the order of hundreds of cell towers to be tested and thus still requires a cohort of testers. Although the reduces scope of testing eases the concerns of expense, logistics, and quality impact are reduced, the fundamental concerns still remain.

A further approach is to remove the need for tester proximity to cell towers at all. By emulating a tester's location rather than requiring an actual presence, a county's cell could be tested by as few as a single tester or by a small group, in not more than a few locations. This further approach avoids the expense concerns of large quantities testers, the logistic concerns of transporting said testers, and the quality impact concerns of extended downtime through testing transport.

Difficulties to implementing remote testing arise due to the FCC's 911 regulations. Under RAY BAUM'S Act, if the remote tester of the E911 system dials 911 from her remote location, the information transmitted to the PSAP indicates her location (rather than the desired result of transmitting the location of the cell towers being tested). Under Kari's law, multi-line telephone systems must support a direct dial to the PSAP, and features like placing a call on hold are deliberately unsupported. Thus, implementation of complex call arrangement such as conference calls is difficult to achieve in a regulatory-compliant manner.

A workaround to by establishing two separate calls, and then creating an audio bridge between the calls.

Environment

Figure 1A:
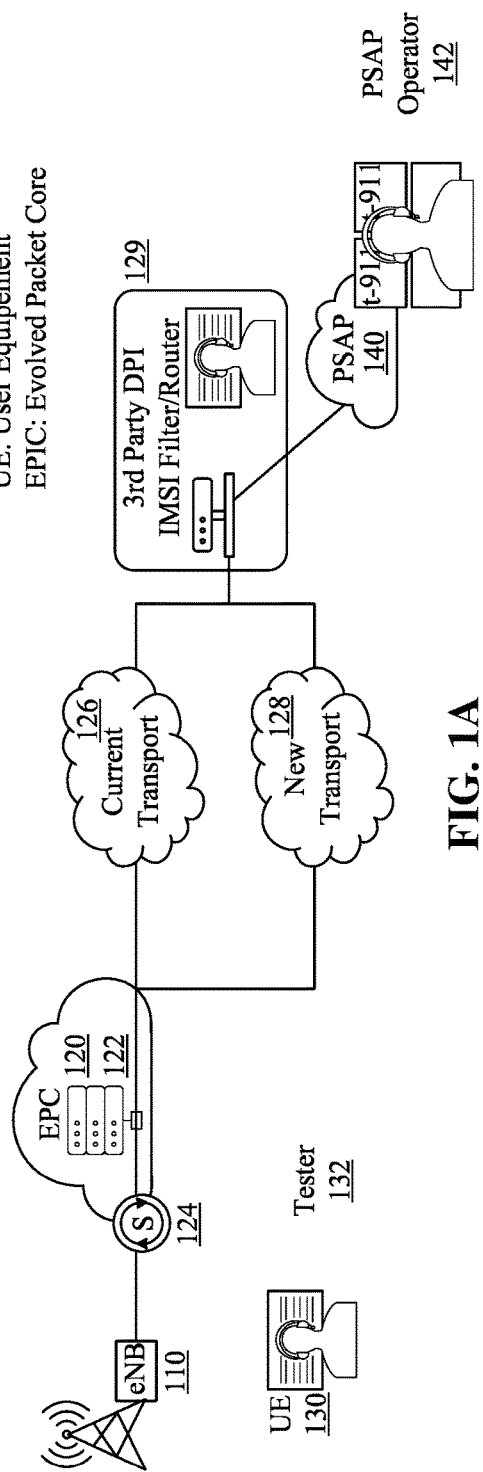
FIGS. 1A and 1B illustrate the E911 testing scenario, according to one implementation of the technology disclosed.
Figure 1B:
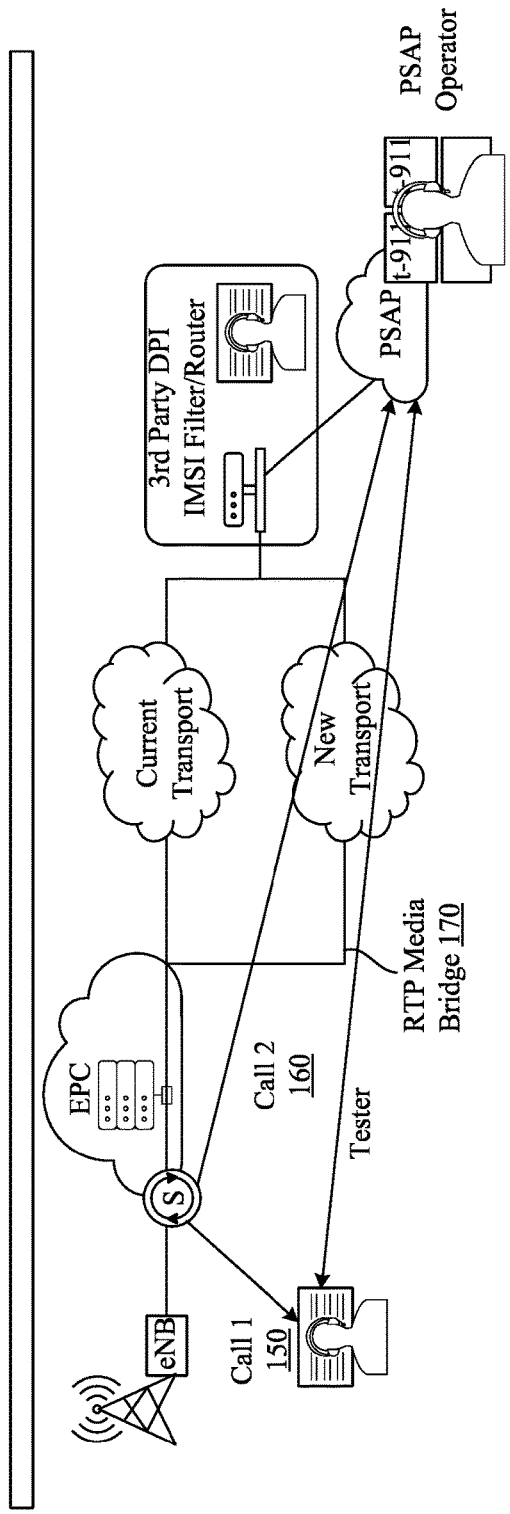

FIGS. 1A-B illustrate E911 testing scenario 100. The scenario 100 includes an evolved NodeB (eNodeB) 110, an evolved packet core (EPC) 120 which includes data center 122, a remote test agent 124, a current transport 126, a new transport 128, a 3$^{rd}$ party Deep Packet Inspection (DPI) International Mobile Subscriber Identity (IMSI) Filter/Router 129, user equipment (UE) 130 controlled by tester 132, a public safety answering point (PSAP) 140 which is staffed by one or more PSAP operator(s) 142, Call 1 150, Call 2 160, and Real-Time Protocol (RTP) media bridge 170.

EPC 120 has components such as the Mobility Management Engine (MME), Serving Gateway (SGW), Packet Gateway (PGW), Policy and Charging Rules Function (PCRF), and Home Subscriber Server (HSS). The MME and SGW are the interfaces that an eNodeB communicates with EPC, and those interfaces are collectively referred to as the S1 interface.

In some implementations, remote test agent 124 is software. In other implementations, remote test agent 124 is a combination of software and hardware.

In some implementations, remote test agent 124 is automatic. In some implementations, remote test agent 124 is controlled by a user that is also physically located in data center 122. In other implementations, remote test agent 124 is controlled remotely. In some of the other implementations, remote test agent 124 is controlled by tester 132.

In some implementations, PSAP 140 may comprise the PSAP where the operator is associated. In some implementations, PSAP 140 may comprise a primary PSAP which itself routes to a secondary PSAP.

Although the environment is described in relation to E911 testing, the technology may have other use cases such confirming call quality reported from automated assurance by listening in to a specific network area.

FIG. 1A illustrates the relationships between the entities of E911 scenario 100.

eNodeB 110 is connected to EPC 120. In normal operation of an E911 call, a UE in the coverage area of eNodeB 110 attempts to connect to a cellular network by sending the connection request to eNodeB 110. During the normal operation, eNodeB 110 provides connection request to EPC 120 to establish a connection to a PSAP. EPC 120 routes the call through some transport (such as current transport 126) through DPI/IMSI 129, and further routed through 911 backhaul networks (not shown) to PSAP 140, where the call is picked up by PSAP operator 142.

In scenario 100, UE 130 operated by tester 132 is not required to be in the eNodeB coverage area. UE 130 may be a cell phone, but may also be a desktop, laptop, smartphone, or any other device that either has built-in cellular service or has telephone capabilities and may emulate cellular service. UE 130 and tester 132 may be in a different county or state than eNodeB 110. For example, although eNodeB 110 and associated PSAP 140 and PSAP operator 142 could be in Pennsylvania, UE 130 and Tester 132 could be in Texas.

A telephone company may desire to replace current transport 126 with new transport 128. For example, current transport 126 may be legacy time-division multiplex technology (e.g. T1 or SONET), and the cost and quality benefits of new transport 128, which may be packet-based as consistent with EPC 120, may prompt the replacement. During the replacement process, to comply with FCC regulations for emergency services, the telephone company must ensure that 911 calls are still correctly routed to PSAP 140 by performing tests.

The next figure illustrates how the technology enables E911 calls where the tester is remoted from the tested coverage location.

FIG. 1B adds to the E911 testing in testing scenario 100, where tester is remote from eNodeB, the calls 150, 160, and operation of the RTP media bridge 170. At data center 122, remote test agent 124 establishes Call 1 150 to UE 130. Remote test agent 124 also establishes call 2 160 to PSAP 140, routed through transport such as new transport 128 to PSAP 140. After both Call 1 150 and call 2 160 are established, remote test agent 124 establishes RTP Media Bridge 170 between UE 130 and PSAP 140. Once RTP media bridge 170 is established, UE 130 transmits at least spoofed latitude and longitude data that simulates the origination of the 911 call via RTP media bridge 170 to PSAP 140. UE 130 may also transmit spoofed elevation data, and spoofed confidence & uncertainty data to PSAP 140. Some test implementations may encompass other information; for example, some 911 systems support media types such as SMS and video. Any information that is suitable for transfer by RTP and may be supported by a 911 system may be part of a test.

Tester 132 states that the call is a test call to PSAP operator 142, and both tester 132 and PSAP operator 142 confirms they can hear one another.

Next, we describe the same calls for emulating an E911 call, earlier described in FIG. 1B, at the session initiation protocol (SIP) level.

Session Initiation Protocol

Figure 2:
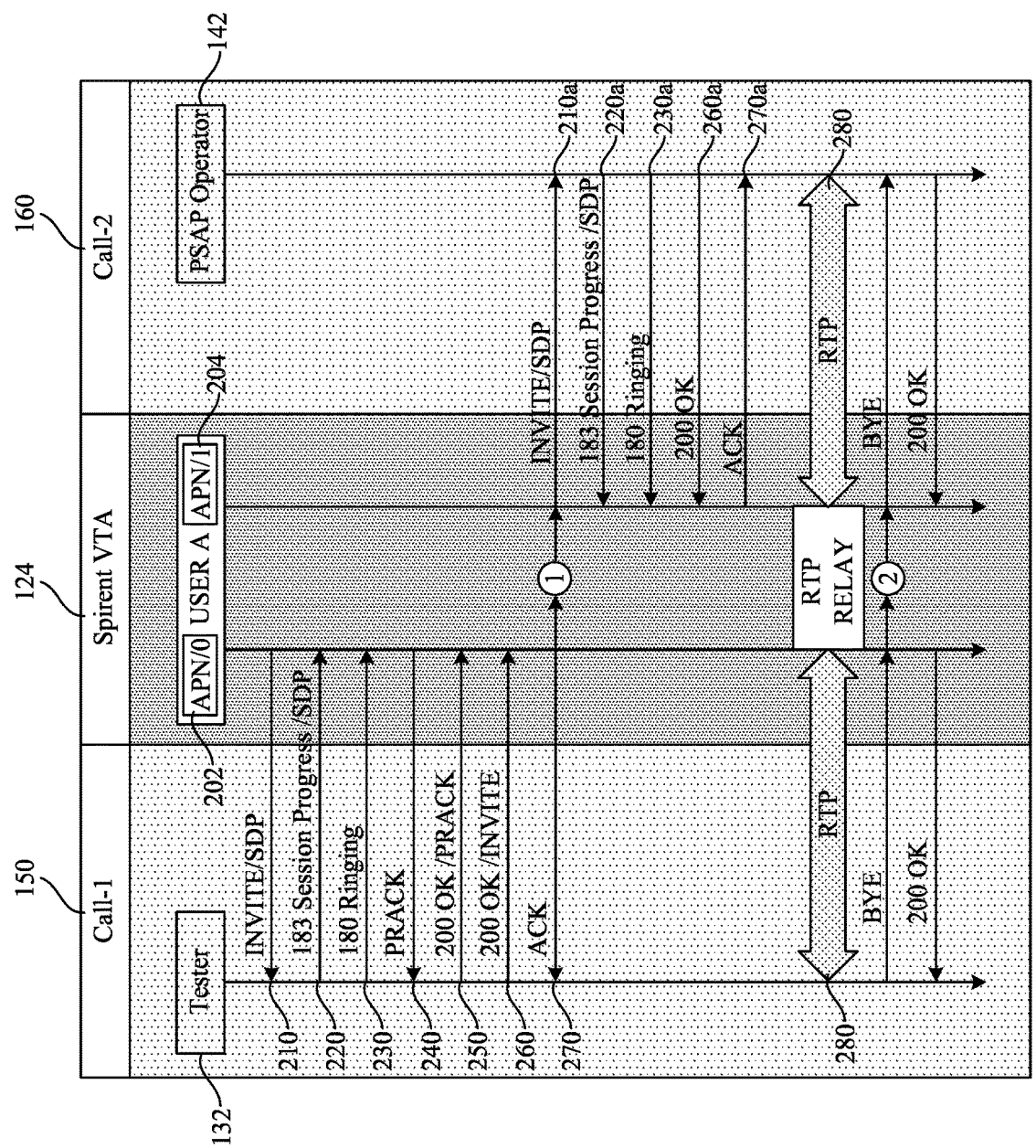
FIG. 2 illustrates the process of emulating E911 calls at the SIP level.

FIG. 2 describes the process of emulating E911 calls at the SIP level.

The SIP process 200 of emulating an E911 call involves establishing Call 1 150, and call 2 160 respectively initiated by the gateways named with Access Point Names (APN), here, APN/0 202 and APN/1 204.

Call 1 150 is a regular voice call, initiated by remote controlled test agent 124, sending an SIP INVITE with Session Description Protocol (SDP) information 210 to User Equipment controlled by tester 132. The UE controlled by tester 132 sends message 183 with SDP 220 and message 180 ringing 230. The remote controlled test agent 124 sends provisional acknowledgement 240. In response, the UE controlled by tester 132 sends message 200 OK 250 and message 200 OK 260 to remote test agent 124. Call 1 150 is now established, and acknowledged 270 by remote test agent 124.

Call 2 160 is a 911 call rather than a conventional call. Analogous steps 210a-270a are performed between remote test agent 124 from the gateway APN/1, except for the provisional acknowledgement 250 and response 260. However, because Call 2 160 is an emergency services call rather than a standard call, analogous steps 210a-270a may instead follow emergency-specific protocols, including test-specific protocols.

For example, in some implementations, Call 2 160 may appear to be a standard 911 call. In other implementations, Call 2 160 may follow 911 testing standards, including identifying the 911 call as a test call. For example, NENA i3 Standard for Next Generation 9-1-1, NENA-STA-010.3b-2021, published Oct. 7, 2121 ("NENA i3 Standard"), page 402 provides for the implementation of test functions as stated in RFC 6881. The entirety of NENA i3 Standard is incorporated by reference. NENA i3 Standard page 402 states that an INVITE message with the Service URN "urn:service:test.sos" are interpreted as requests to initiate test calls, and that PSAPs may respond with 200 OK or 486 Busy. Thus, E911 test calls to NENA i3 may use the test call function for Call 2 160, where 210a includes urn:service:test.sos and 260a includes 200 OK.

Once both calls have been established, RTP Media Bridge 170 is established 280.

Secure UserPlane Location

Figure 3:
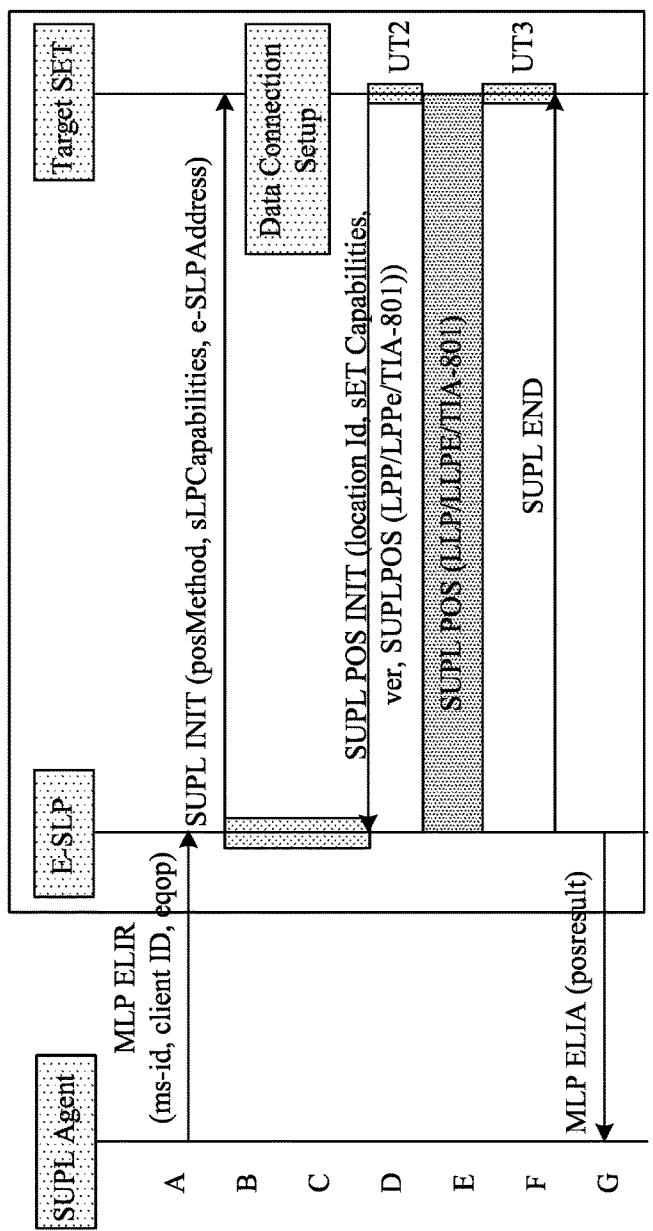
FIG. 3 illustrates a timing diagram that explains the steps of providing positioning information via Secure User Plane Location (SUPL).

FIG. 3. Illustrates a timing diagram that explains the steps of providing positioning information via Secure User Plane Location (SUPL).

Timing diagram 300 illustrates how location information is obtained and provided to the PSAP. This is a simplification of OMA, UserPlane Location Protocol 2.0.4 p 107-08, the entirety of which has been incorporated by reference.

At step A, the SUPL Agent issues an MLP ELIR message to the E-SLP, with which SUPL Agent is associated. The MLP ELIR message may include the SET IP address and location data. The E-SLP authenticates the SUPL Agent and check if the SUPL Agent is authorized for the service it requests, based on the client-id received.

At step B, the E-SLP initiates the location session with the SET using the SUPL INIT message. The SUPL INIT message contains at least session-id (not shown in image), proxy/non-proxy mode indicator and the intended positioning method. The SUPL INIT contains the E-SLP address if the E-SLP is not the H-SLP for the SET. The SUPL INIT MAY contain the desired Quality of Position (QoP). The E-SLP also includes Notification element in the SUPL INIT message indicating location for emergency services and, according to local regulatory requirements, whether notification or verification to the target SET is or is not required. Before the SUPL INIT message is sent the E-SLP also computes and stores a hash of the message.

At step C, the SET takes needed action preparing for establishment or resumption of a secure connection.

At step D, the SET evaluates the Notification rules and follow the appropriate actions. In some aspects, the SET also checks the proxy/non-proxy mode indicator to determine if the E-SLP uses proxy or non-proxy mode. In this case, proxy mode is used, and the SET establishes a secure connection to the E-SLP using either the provisioned H-SLP or defaulted E-SLP address, if no E-SLP address was received in step C, or the E-SLP address received in step C. The SET then sends a SUPL POS INIT message to start a positioning session with the E-SLP. The SET sends the SUPL POS INIT message even if the SET supported positioning technologies do not include the intended positioning method indicated in the SUPL INIT message. The SUPL POS INIT message contains at least session-id, SET capabilities, a hash of the received SUPL INIT message (ver) and Location ID (lid). The SET capabilities include the supported positioning methods (e.g., SET-Assisted A-GPS, SET-Based A-GPS) and associated positioning protocols (e.g., RRLP, RRC, TIA-801 or LPP/LPPe). The SET MAY provide NMR specific for the radio technology being used (e.g., for GSM: TA, RXLEV). The SET MAY provide its position, if this is supported. The SET MAY set the Requested Assistance Data element in the SUPL POS INIT. If a coarse position calculated based on information received in the SUPL POS INIT message is available that meets the required QoP, the E-SLP SHALL directly proceed to step G and not engage in a SUPL POS session.

At step E, the E-SLP checks that the hash of SUPL INIT matches the one it has computed for this particular session. Based on the SUPL POS INIT message including posmethod(s) supported by the SET the E-SLP then determines the posmethod. If required for the posmethod, the E-SLP uses the supported positioning protocol (e.g., RRLP, RRC, TIA-801 or LPP/LPPe) from the SUPL POS INIT message.

The SET and the E-SLP MAY exchange several successive positioning procedure messages.

The E-SLP calculates the position estimate based on the received positioning measurements (SET-Assisted) or the SET calculates the position estimate based on assistance obtained from the E-SLP (SET-Based).

At step F, once the position calculation is complete the E-SLP sends the SUPL END message to the SET informing it that no further positioning procedure will be started and that the location session is finished. The SET releases the IP connection to the E-SLP and releases all resources related to this session.

At step G, the E-SLP sends the position estimate back to the SUPL Agent by means of the MLP ELIA message and the E-SLP releases all resources related to this session.

| Timer | Default value (seconds) | description | expiration |
|---|---|---|---|
| UT2 | 11 | From sending of SUPL POS INIT to receipt of first SUPL POS, SUPL REPORT or SUPL END message. UT2 is not needed if the SUPL POS INIT message contains the first SUPL POS element. | For immediate applications the SET sends SUPL END to the SLP and clears all session resources. For triggered applications, the SET skips the SUPL POS session and continues the triggered session. |

-continued

| Timer | Default value (seconds) | description | expiration |
|---|---|---|---|
| UT3 | 10 | From sending of the last SUPL POS message to receipt of SUPL END, SUPL REPORT or SUPL NOTIFY. In cases where there is no SUPL POS message sent from SET, timer UT3 is not used. | For immediate applications, the SET sends SUPL END to the SLP and clears all session resources. For triggered applications, the SET continues the triggered session. |
| ST2 | 10 seconds for proxy, 50+ optionally response time in QoP | For proxy mode: from sending of SUPL INIT to receipt of SUPL POS INIT, SUPL TRIGGERED START or SUPL END. For non-proxy mode: from sending SUPL INIT to (a) receipt of notification (internal communication between SPC and SLC) that SUPL POS INIT has been received, (b) receipt of RLP-SSRP(SUPL END) from V-SLP, (c) receipt of SUPL TRIGGERED START, (d) receipt of SUPL REPORT or (e) receipt of SUPL END. | For non-roaming scenario: Inform SUPL agent that the session has ended. For roaming scenario: Inform SUPL agent or, where applicable, R-SLP that the session has ended. For proxy: Clear session resources at SLP For non-proxy: Clear session resources at SLC and send internal communication to SPC to clear session resources at SPC where applicable. |

Figure 4:
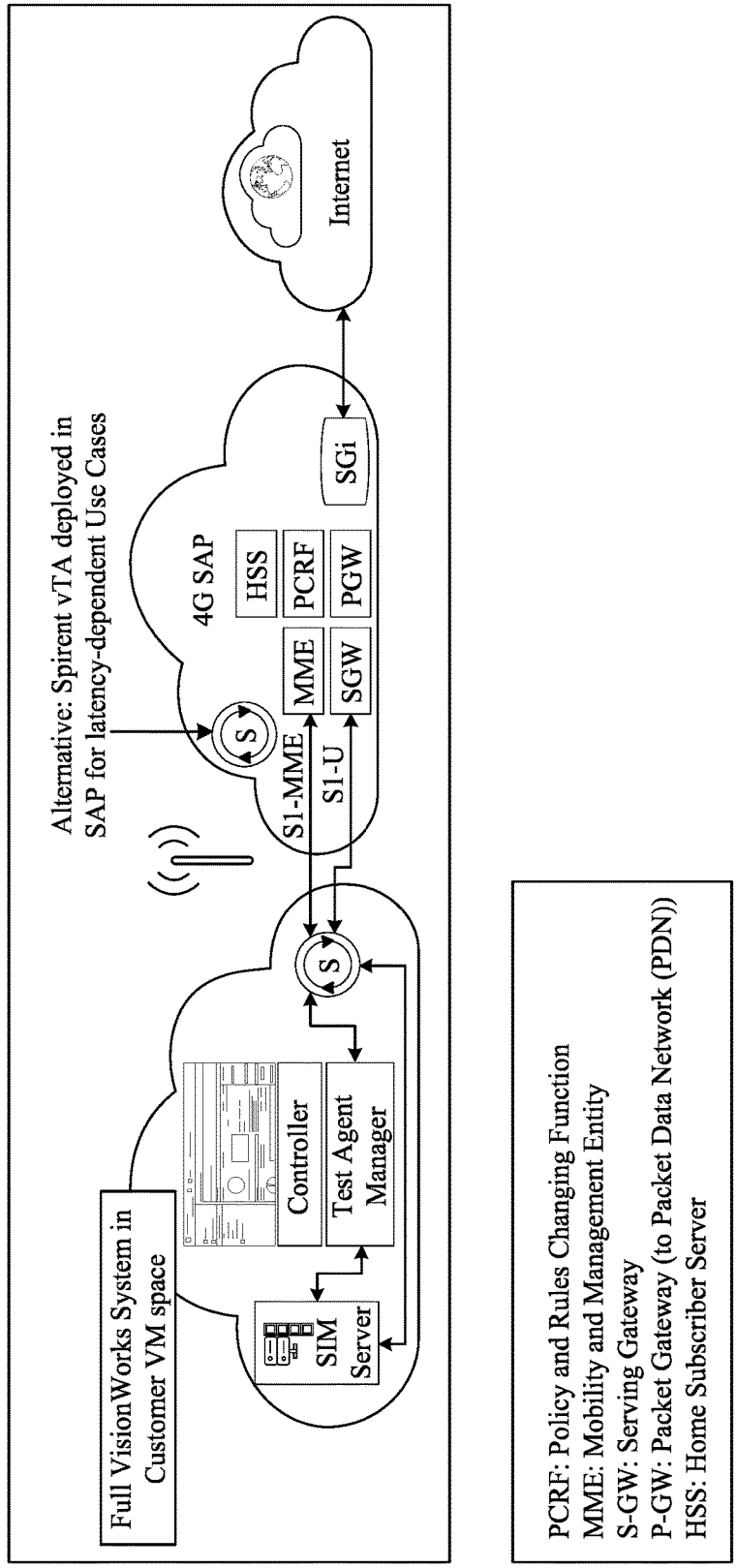
FIG. 4 illustrates the placement of agents at different data centers.

FIG. 4 demonstrates the placement of remote test agents in multiple data centers.

Earlier discussions of the technology discuss remote test agent 124 as if it is a single agent at one of the data center 122 controlling EPC 120. Since every data center that manages EPC 120 can control routing, that is indeed one viable implementation of the technology. Where latency may be a concern, other implementations may involve agents placed in different data centers that manage EPC 120. If tester 132 is local to Pennsylvania and a different tester is local to Texas, the respective testers could be called by respective agents at Service Access Points (SAP) in closer proximity to the respective testers.

Computer System

Figure 5:
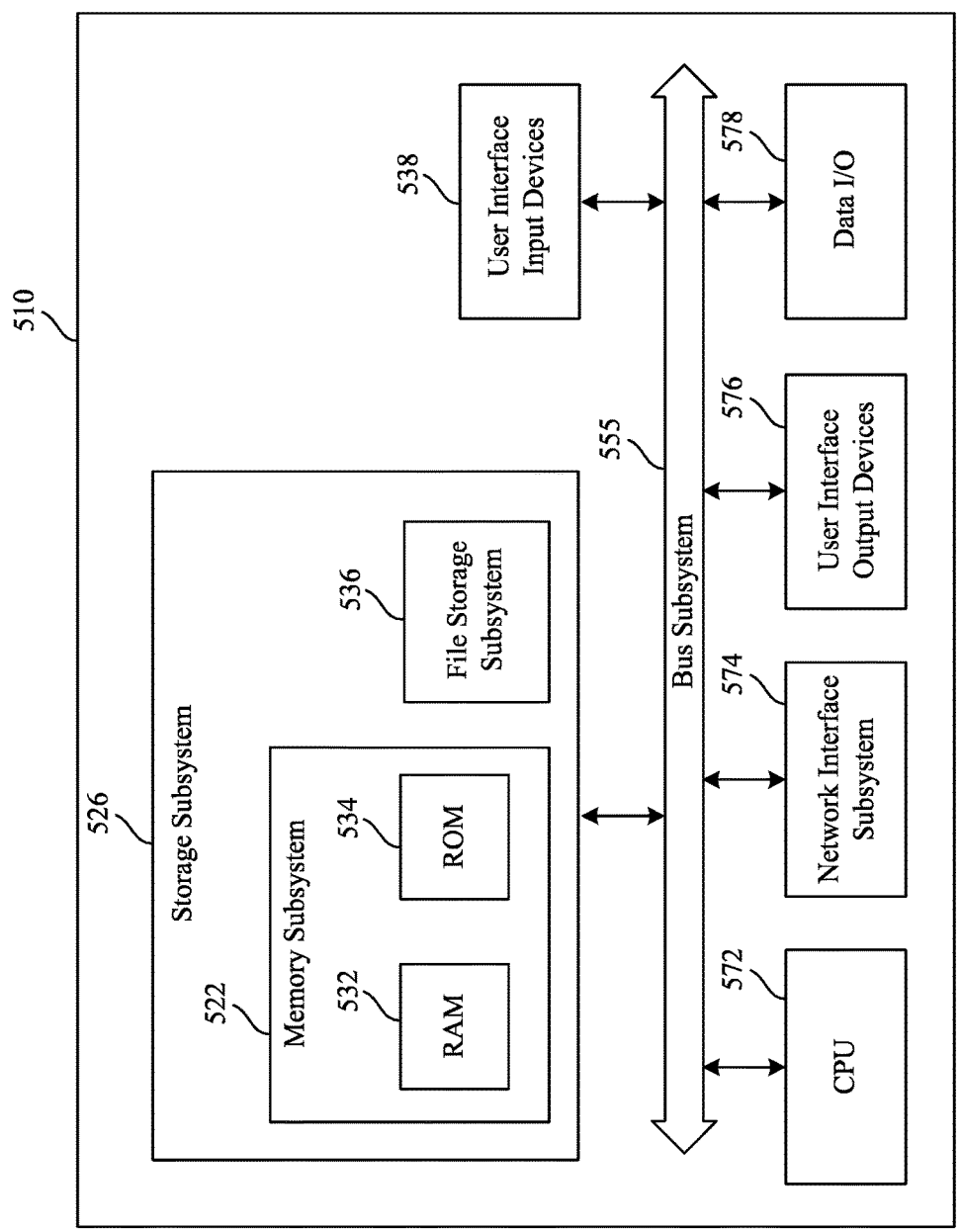
FIG. 5 illustrates a simplified block diagram of a computer system that can be used to manage remote test agents, according to one implementation of the technology disclosed.

FIG. 5 is a simplified block diagram of a computer system 500 that can be used to manage remote test agents. Computer system 510 includes at least one central processing unit (CPU) 572 that communicates with a number of peripheral devices via bus subsystem 555. These peripheral devices can include a storage subsystem 510 including, for example, memory devices and a file storage subsystem 536, user interface input devices 538, user interface output devices 576, a network interface subsystem 574, and data I/O call. The input and output devices allow user interaction with computer system 510. Network interface subsystem 574 provides an interface to outside networks, including an interface to corresponding interface devices in a communication network with other computer systems.

In one implementation, remote test agent 124 of FIG. 1A can be communicably linked to the storage subsystem 510 and the user interface input devices 538. User interface input devices 538 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 510.

User interface output devices 576 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 500 to the user or to another machine or computer system.

Storage subsystem 526 stores programming and data constructs that provide the functionality of some or all of the modules and methods described herein.

Memory subsystem 522 used in the storage subsystem 526 can include a number of memories including a main random access memory (RAM) 534 for storage of instructions and data during program execution and a read only memory (ROM) 532 in which fixed instructions are stored. A file storage subsystem 536 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 536 in the storage subsystem 526, or in other machines accessible by the processor.

Bus subsystem 555 provides a mechanism for letting the various components and subsystems of computer system 510 communicate with each other as intended. Although bus subsystem 555 is shown schematically as a single bus, alternative implementations of the bus subsystem can use multiple busses.

Computer system 510 itself can be of varying types including a personal computer, a portable computer, a workstation, a computer terminal, a network computer, a television, a mainframe, a server farm, a widely-distributed set of loosely networked computers, or any other data processing system or user device. Due to the ever changing nature of computers and networks, the description of computer system 510 depicted in FIG. 5 is intended only as a specific example for purposes of illustrating the preferred embodiments of the present invention. Many other configurations of computer system 500 are possible having more or less components than the computer system depicted in FIG. 5.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Particular Implementations

Some particular implementations and features are described in the following discussion.

In one implementation, a disclosed method of testing voice connection routing over 911 circuits as if voice calls originated from an E911 device in coverage areas of cell tower locations, without requiring a physical presence of the E911 device in each coverage area, includes, using a remote test agent audio bridge and tester: originating a first call to a test user with a first phone number at a first location, creating a media bridge, emulating an E911-compliant mobile device to originate a second call to a 911 operator, wherein the emulation comprises spoofing a call origination from an origination location being tested, the spoofed origination location being within coverage of an originating cell, the spoofing including providing an originating cell ID, a mobile device latitude, a mobile device longitude, and the first phone number, relaying audio over the media bridge as a verbal exchange between the first and the second calls wherein the verbal exchange includes a verbal statement by the test user to the 911 operator and a verbal response from the 911 operator, and logging, as test results, an evaluation of verbal exchange.

This method and other implementations of the technology disclosed can include one or more of the following features and/or features described in connection with additional methods disclosed. In the interest of conciseness, the combinations of features disclosed in this application are not individually enumerated and are not repeated with each base set of features.

For some implementations of the disclosed method, the remote test agent audio bridge originating the second call over an S2 interface between an emulated cell tower and a packet core network.

For some implementations, the second call is routed to a primary PSAP by the remote test agent audio bridge. For other implementations, the second call is routed to a secondary PSAP by the remote test agent audio bridge.

For some implementations, the providing further includes providing a mobile device elevation, and confidence & uncertainty.

For some implementations, the relaying further includes the first phone number, the spoofed mobile device latitude and longitude to information on a display used by the 911 operator.

For some implementations, the relaying further includes one or more of the remote test agent audio bridges and testers repeatedly originating, creating, emulating, relaying, and logging spoofed calls within the coverage areas of 10-20% of originating cells connected by an updated infrastructure to 911 operators.

For some implementations, the relaying further includes relaying video over the RTP media bridge.

For some implementations, the emulation further includes providing a URN comprising a string "test.sos" that is used by PSAPs to screen test calls.

For some implementations, the test user is physically located outside of the coverage area of the originating cell.

For some implementations, the remote controlled test agent is co-located with one of numerous Evolved Packet Core data centers that route calls to PSAPs.

For some implementations, the test user is co-located with one of numerous Evolved Packet Core data centers that route calls to PSAPs.

For some implementations, the test user is remote from one of numerous Evolved Packet Core data centers that route calls to PSAPs.

For some implementations, the remote test agent audio bridge runs in a container or on a virtual machine For some implementations, the media bridge practices a Real-time Transport Protocol (RTP).

For some implementations, the mobile device latitude and mobile device longitude is provided through Mobile Location Protocol (MLP).

For some implementations, the spoofed origination location is provided, using Secure User Plane Location (SUPL), from a SUPL Enabled Terminal (SET) to the remote test agent audio bridge.

For some implementations, the SUPL is network-initiated. Furthermore, in some implementations, the positioning protocols used in SUPL POS messages include one of LLP, LPPe, TIA-801.

For some implementations, the first call is a normal call and the second call is an emergency services call. Furthermore, for some implementations, the first call and second call have separate Access Point Names (APNs).

Other implementations may include a non-transitory computer readable storage medium storing instructions executable by a processor to perform a method as described above. Yet another implementation may include a system including memory and one or more processors operable to execute instructions, stored in the memory, to perform a method as described above.

The invention claimed is:

1. A computer-implemented method of testing voice connection routing over 911 circuits as if voice calls originated from an E911 device in coverage areas of cell tower locations, without requiring a physical presence of the E911 device in each coverage area, including:

using a remote test agent audio bridge and tester:
originating a first call to a test user with a first phone number at a first location;
emulating an E911-compliant mobile device to establish a second call to a 911 operator, wherein the emulation includes spoofing a call origination from an origination location being tested, the spoofed origination location being within coverage of an originating cell, the spoofing including providing an originating cell ID, a mobile device latitude, a mobile device longitude, and the first phone number;
creating a media bridge between the first call and the second call;

relaying audio over the media bridge as a verbal exchange between the first and the second calls wherein the verbal exchange includes:
a verbal statement by the test user to the 911 operator; and
a verbal response from the 911 operator; and
logging, as test results, an evaluation of verbal exchange.

2. The method of claim 1, further including the remote test agent audio bridge originating the second call over an S1 interface between an emulated cell tower and a packet core network.

3. The computer-implemented method of claim 1, wherein the media bridge practices a Real-time Transport Protocol (RTP).

4. The computer-implemented method of claim 1, wherein the providing further includes providing a mobile device elevation, and confidence & uncertainty.

5. The computer-implemented method of claim 1, wherein the verbal statement and response include the first phone number, the spoofed mobile device latitude and longitude to information on a display used by the 911 operator.

6. The computer-implemented method of claim 1, wherein the mobile device latitude and mobile device longitude is provided through Mobile Location Protocol (MLP).

7. The computer-implemented method of claim 1, wherein the emulation further includes providing a URN includes a string "test.sos" that is used by PSAPs to screen test calls.

8. The computer-implemented method of claim 1, wherein the test user is outside of the coverage area of the originating cell.

9. The computer-implemented method of claim 1, further including the first call being a normal call and the second call being an emergency services call.

10. The computer-implemented method of claim 9, wherein the first call and second call have separate Access Point Names (APNs).

11. A non-transitory computer readable storage medium impressed with computer program instructions to test voice connection routing over 911 circuits as if voice calls originated from an E911 device in coverage areas of cell tower locations, without requiring a physical presence of the E911 device in each coverage area, the instructions, when executed on a processor, implement a method comprising:
using a remote test agent audio bridge and tester:
originating a first call to a test user with a first phone number at a first location;
emulating an E911-compliant mobile device to establish a second call to a 911 operator, wherein the emulation includes spoofing a call origination from an origination location being tested, the spoofed origination location being within coverage of an originating cell, the spoofing including providing an originating cell ID, a mobile device latitude, a mobile device longitude, and the first phone number;
creating a media bridge between the first call and the second call;
relaying audio over the media bridge as a verbal exchange between the first and the second calls wherein the verbal exchange includes:
a verbal statement by the test user to the 911 operator; and
a verbal response from the 911 operator; and
logging, as test results, an evaluation of verbal exchange.

12. The non-transitory computer readable storage medium of claim 11, further including the remote test agent audio bridge originating the second call over an S1 interface between an emulated cell tower and a packet core network.

13. The non-transitory computer readable storage medium of claim 11, wherein the emulation further includes providing a URN includes a string "test.sos" that is used by PSAPs to screen test calls.

14. The non-transitory computer readable storage medium of claim 11, further including the first call being a normal call and the second call being an emergency services call.

15. The non-transitory computer readable storage medium of claim 14, wherein the first call and second call have separate Access Point Names (APNs).

16. A system including one or more processors coupled to memory, the memory loaded with computer instructions to test voice connection routing over 911 circuits as if voice calls originated from an E911 device in coverage areas of cell tower locations, without requiring a physical presence of the E911 device in each coverage area, the instructions, when executed on a processor, implement actions comprising:
using a remote test agent audio bridge and tester:
originating a first call to a test user with a first phone number at a first location;
emulating an E911-compliant mobile device to establish a second call to a 911 operator, wherein the emulation includes spoofing a call origination from an origination location being tested, the spoofed origination location being within coverage of an originating cell, the spoofing including providing an originating cell ID, a mobile device latitude, a mobile device longitude, and the first phone number;
creating a media bridge between the first call and the second call;
relaying audio over the media bridge as a verbal exchange between the first and the second calls wherein the verbal exchange includes:
a verbal statement by the test user to the 911 operator; and
a verbal response from the 911 operator; and
logging, as test results, an evaluation of verbal exchange.

17. The system of claim 16, further including the remote test agent audio bridge originating the second call over an S1 interface between an emulated cell tower and a packet core network.

18. The system of claim 16, wherein the media bridge practices a Real-time Transport Protocol (RTP).

19. The system of claim 16, wherein the providing further includes providing a mobile device elevation, and confidence & uncertainty.

20. The system of claim 16, wherein the verbal statement and response include the first phone number, the spoofed mobile device latitude and longitude to information on a display used by the 911 operator.

* * * * *